Aug. 23, 1932.  L. A. BENT  1,873,265
STERILIZER
Filed April 3, 1931   2 Sheets-Sheet 2
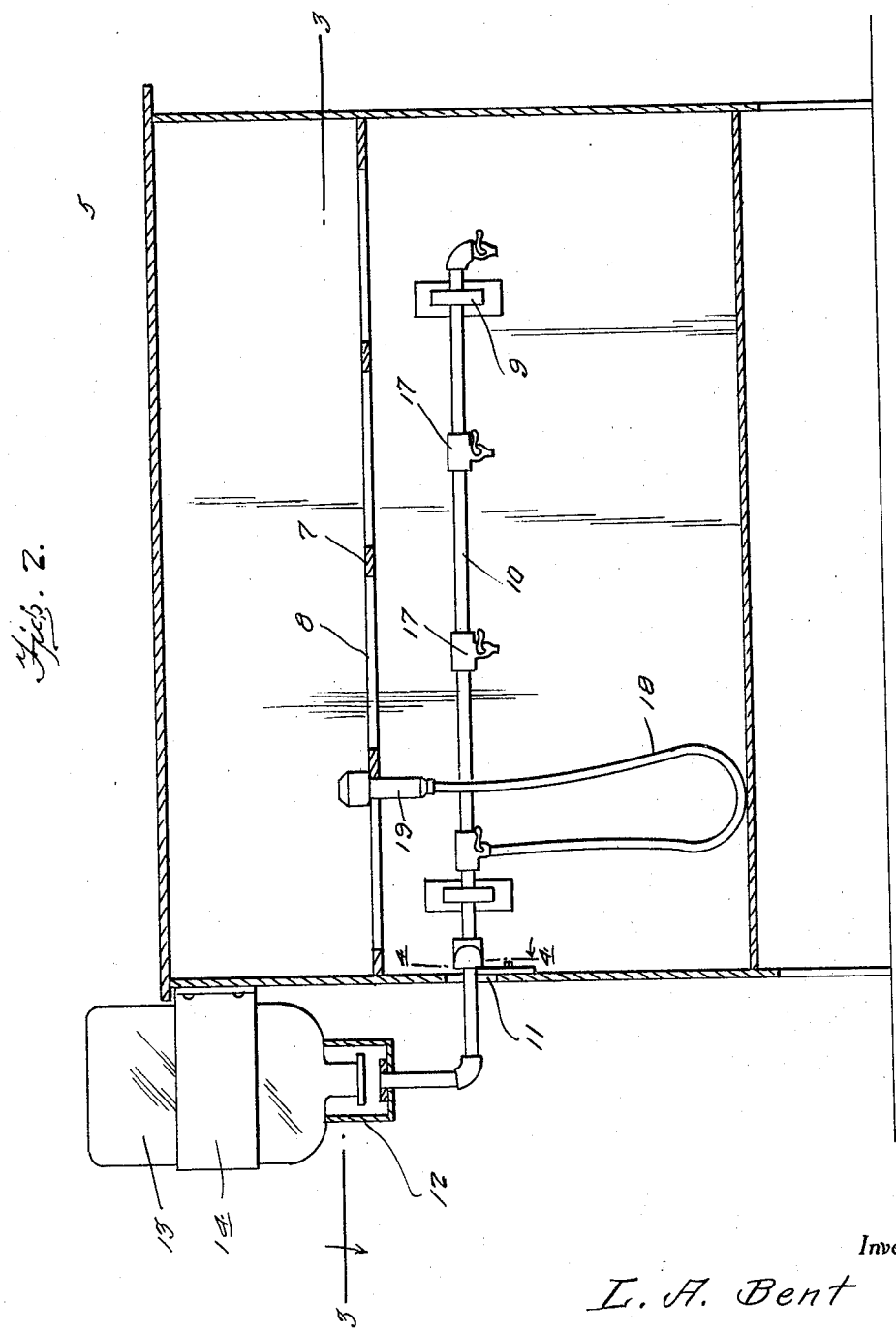

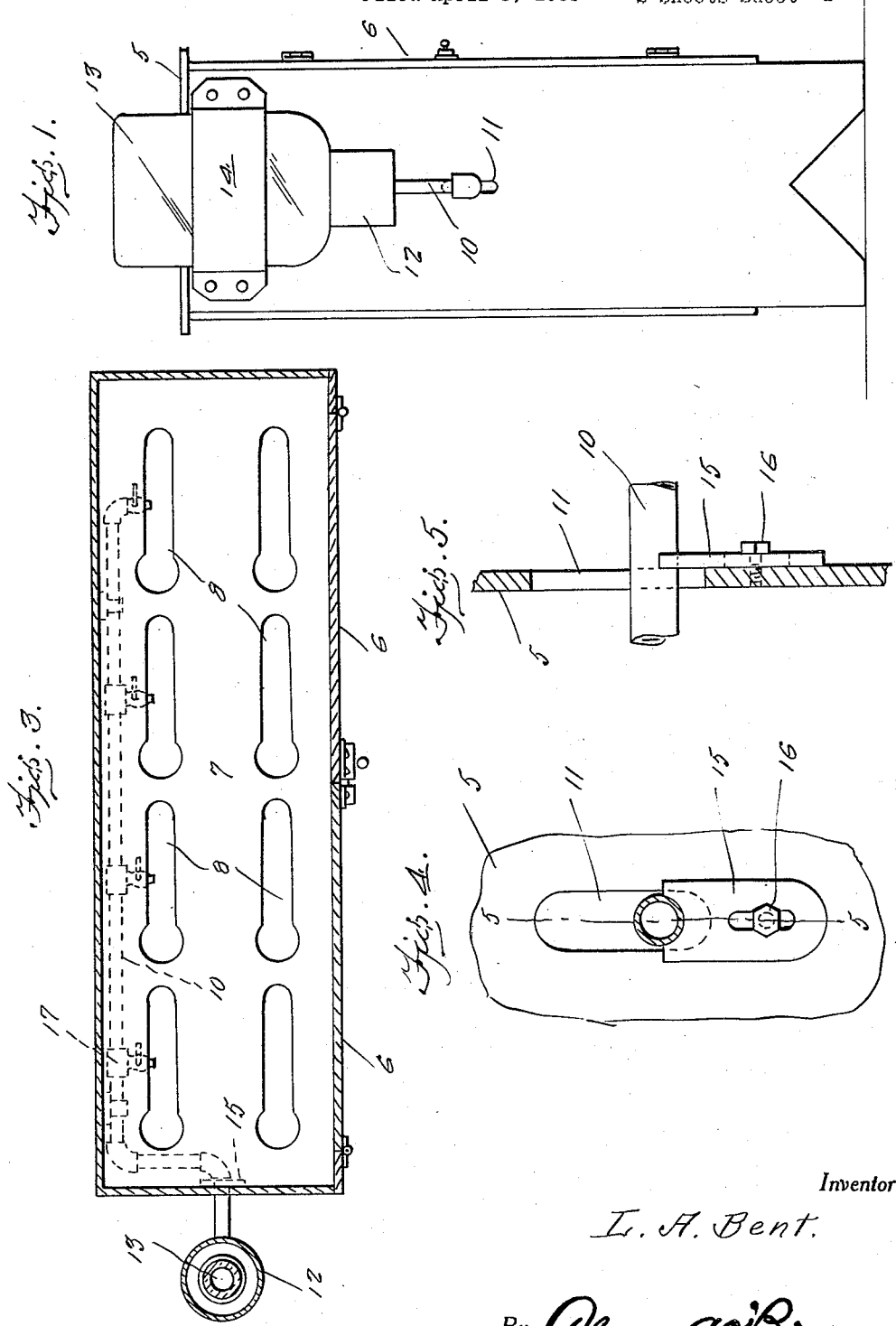

Patented Aug. 23, 1932

1,873,265

UNITED STATES PATENT OFFICE

LAWRENCE A. BENT, OF JANESVILLE, WISCONSIN

STERILIZER

Application filed April 3, 1931. Serial No. 527,511.

This invention pertains to a sterilizing device especially adapted for sterilizing the tubes of vacuum milking machines and the primary object of this invention is to provide a device for sterilizing the milking tubes in a simple, inexpensive and practical manner.

A still further object of the invention is to provide a sterilizer for the purpose above mentioned which is portable, being easily moved from place to place so that the sterilizing of the tubes may be accomplished either indoors or out of doors.

A still further object of the invention is to provide a device of the character above mentioned, whereby the milking tube after each milking operation may be subjected to a sterilizing treatment of lye solution until such time as the milking machine is to be again put into use.

A still further object of the invention is to provide a sterilizing device of the character above mentioned which includes a suitable cabinet for accommodating the milking tubes during the period of sterilization.

Other objects and advantages of the invention will become apparent from a study of the following description, taken in connection with the accompanying drawings wherein:

Figure 1 is an end elevational view of the device.

Figure 2 is a vertical longitudinal sectional elevational view therethrough.

Figure 3 is a horizontal longitudinal sectional view taken substantially on the line 3—3 of Figure 2.

Figure 4 is a detail sectional view taken on the line 4—4 of Figure 2.

Figure 5 is a sectional elevational view taken substantially on the line 5—5 of Figure 4.

Referring more in detail to the drawings, it will be seen that the sterilizing device comprises a cabinet 5 which is of any suitable size and may be constructed from metal, wood or any other suitable material. One side of the cabinet 5 is opened, and hinged doors 6 are provided for the open side of the cabinet.

Suitably mounted in the cabinet 5 is a tray or rack 7 provided with a plurality of elongated slots 8 enlarged at one end for initially receiving a teat cup.

Supported on the rear wall of the cabinet beneath the rack or tray 7 are brackets 9 which support for vertical adjustment a horizontally disposed feed pipe 10 which at one end extends through a vertical slot 11 provided in an end wall of the cabinet 5. On said one end, there is mounted on the pipe 10 a cup 12 of suitable capacity and designed to receive the neck of an inverted jar or container 13. Jar 13 is supported in a vertical position through the medium of a suitable bracket 14.

A solution of lye or like sterilizing solution is contained in the jar 13 and when the jar 13 is positioned with respect to the cup 12 as suggested in Figures 1 and 2, the solution from the jar will be fed by gravity to the cup 12 and from the cup 12 will pass through the pipe 10.

For securing the pipe 10 at the desired vertical adjustment, there is provided on the end wall of the cabinet adjacent the slot 11 a supporting plate 15 that may be secured at the desired adjustment by suitable slot and bolt means 16. The plate 15 at its upper edge is provided with an arcuate notch for accommodating an adjacent portion of the pipe 10. Obviously by securing the plate 15 in a raised or lowered position pipe 10 will be retained at the desired adjustment and cup 12 adjusted vertically relative to the jar 13 for controlling the flow from the jar 13 to the cup 12 in a manner thought apparent.

Within the cabinet 5, the pipe 10 is provided with a plurality of relatively spaced pet cocks 17 each of which is adapted to accommodate the free end of a milk tube 18 provided with the usual teat cup 19 that may be engaged with a desired one of the slots 8 for suspending the teat cup within the cabinet.

In operation, and as is apparent from a study of Figure 2, subsequent to a milking operation, the milk tubes of a vacuum milking machine may be arranged in the cabinet 5 as shown in Figure 2 with the ends of the tubes 18 suitably connected to the pet cocks 17.

All of the pet cocks 17, or selected ones of the pet cocks may be opened, and as is apparent, the solution from the jars 13 emptying into the cup 12 will flow by gravity from the cup through the pipe 10 and through the several pet cocks to pass into the tubes 18 and the cups 19 associated with the tubes to the capacity of the tubes and their cups. When the milk tubes are to be used, the same may be disengaged from the pet cocks 17, and subsequently connected to the vacuum system of the milking machine for rinsing the milking tubes, a practice common to the dairyman. Thus, with a device of this character, the milking tubes may be first treated to a solution of lye or other sterilizing solution, and then just prior to use may be rinsed and when coupled to the machine for milking, will be in a thoroughly sanitary condition.

Leaving the lye solution in the milk tube until just before these tubes are to be coupled with the milking tubes for milking purposes, will convert any residue of milk and fat left in the tubes subsequent to milking, into soluble soaps and ash that can easily be rinsed out with cold water.

Even though I have herein shown and described the preferred embodiment of the invention, it is to be understood that the same is susceptible of changes, modifications and improvements coming within the scope of the appended claims.

Having thus described my invention, what I claim as new is:

1. A sterilizing device for milking tubes comprising a cabinet opened at one side, doors for the cabinet, means in the cabinet for supporting the teat cups of the tubes in a substantially vertical position, a pipe mounted in the cabinet, means for adjusting the pipe vertically with respect to the cabinet, and pet cocks mounted on the pipe with which the ends of the milk tubes may be connected, and gravity flow means exteriorly of the cabinet for feeding a solution to said pipe.

2. A sterilizing device for milking tubes comprising a cabinet opened at one side, doors for the cabinet, means in the cabinet for supporting the teat cups of the tubes in a substantially vertical position, a pipe mounted in the cabinet, means for adjusting the pipe vertically with respect to the cabinet, and pet cocks mounted on the pipe with which the ends of the milk tubes may be connected, and gravity flow means exteriorly of the cabinet for feeding a solution to said pipe, and means for controlling the flow of the solution to said pipe.

3. A sterilizing device for milking tubes comprising in combination means for supporting the teat cups of milking tubes with the open ends of the cups uppermost, a relatively fixed container, a relatively rigid horizontally disposed conduit adjustable vertically with respect to said means and said container, said conduit being provided with a cup for receiving the contents of said container, and being also provided with valved means adapted to be connected to the milk tubes whereby the contents of said container is fed to the teat cups, under control.

4. In combination, means for supporting teat cups of milking tubes with the open ends of the cups uppermost, and means for causing a flow of cleansing and sterilizing fluid to said teat cups, said means including a horizontally disposed pipe, means for mounting the pipe in adjusted position with respect to the teat cup supporting means, and pet cocks arranged in relatively spaced relation on said pipe.

In testimony whereof I affix my signature.

LAWRENCE A. BENT.